United States Patent [19]

Chandra et al.

[11] Patent Number: 4,998,259
[45] Date of Patent: Mar. 5, 1991

[54] GATLING GUN LASER PULSE AMPLIFIER USING ROTATING MIRRORS

[75] Inventors: Suresh Chandra, Falls Church; Geraldine H. Daunt, Arlington, both of Va.

[73] Assignee: The United States of America as represented by the Secretary of the Army, Washington, D.C.

[21] Appl. No.: 500,968

[22] Filed: Mar. 29, 1990

[51] Int. Cl.⁵ .................................. H01S 3/082
[52] U.S. Cl. ............................. 372/68; 372/15; 372/21; 372/97; 372/99; 350/486
[58] Field of Search ............... 372/97, 108, 99, 14, 372/15, 23, 24, 21, 68, 16; 350/486

[56] References Cited
U.S. PATENT DOCUMENTS

| | | | |
|---|---|---|---|
| 3,310,753 | 3/1967 | Burkhalter | 372/16 |
| 3,541,468 | 11/1970 | Hammond, Jr. et al. | 372/16 |
| 3,701,048 | 10/1972 | Jennings, Jr. | 372/69 |
| 3,924,937 | 12/1975 | Munroe et al. | 372/97 |
| 4,682,340 | 7/1987 | Dave et al. | 372/108 |
| 4,734,911 | 3/1989 | Bruesselbach | 372/21 |

Primary Examiner—Frank Gonzalez
Assistant Examiner—Galen J. Hansen
Attorney, Agent, or Firm—Milton W. Lee; Max L. Harwell; Anthony T. Lane

[57] ABSTRACT

A laser oscillator system which transmits laser input beam pulses through a polarizer onto the surface of a rotating mirror which routes the laser beam pulses sequentially into a plurality of stationary phase conjugate amplifiers. The pulse repetition frequency of the oscillator input beam pulses is much higher than any one of the amplifiers can handle without overheating. The amplifiers are positioned in a circle around the laser oscillator axis. The polarizer and rotating mirror are positioned on the oscillator axis. The mirror is synchronized with the input beam pulses so that each subsequent input beam pulse enters the next amplifier in sequence. Each phase conjugate amplifier has associated therewith a quarter-wave plate and a phase conjugate mirror at its output. The phase conjugate mirror is preferably comprised of a focusing lens and a stimulated Brillouin scattering cell. The cell retroreflects the once amplified beam pulse back through the quarter-wave plate, which has now rotated the beam pulse polarization through 90°. Each pulse is amplified a second time and is reflected off the mirror and the back of the polarizer and out of the laser system. The laser system makes possible the handling of a large pulse repetition frequency of amplified output laser beam pulses.

4 Claims, 3 Drawing Sheets

GATLING GUN LASER PULSE AMPLIFIER USING ROTATING MIRRORS

The invention described herein may be manufactured, used, and licensed by the U.S. Government for governmental purposes without the payment of any royalties thereon.

BACKGROUND OF INVENTION

1. Field

The invention is in the field of high brightness laser systems which was a low energy master oscillator laser beam and a power amplifier usually limited to a low pulse repetition rate, and specifically to the time multiplexing of a plurality of phase conjugated power amplifiers in which succeeding oscillator laser beam pulses are reflected off rotating mirrors and directed toward each of a plurality of phase conjugated power amplifiers in a Gatling gun fashion of firing the amplifiers either sequentially or in bursts to provide a high pulse repetition rate for the laser system.

2. Prior Art

High brightness lasers are often of the design which involves a master oscillator and a power amplifier. When using solid state lasers, the maximum pulse repetition frequency (PRF) of these lasers is usually limited by thermal effects in the power amplifier laser rods. The PRF of the power amplifiers is usually limited to about 60 Hertz. Sufficiently low power master oscillators may be operated at arbitrarily high PRFs. One known high brightness laser which is limited in frequency is a laser oscillator and in optical alignment therewith a polarizer which pases the oscillator laser beam therethrough directly into a phase conjugate power amplifier. The solid state laser rod type amplifier has a quarter-wave plate at its output and a phase conjugate mirror comprised of a focusing lens and a stimulated Brillouin scattering cell. The quarter-wave plate converts the incident linearly polarized beam from the oscillator laser to circular polarization, the lens focuses the beam into the cell, and the cell retroreflects the beam back out and through the quarter-wave plate which converts the beam back to a linear polarization that is rotated by 90° from the original polarization. The 90° polarization rotated beam is amplified by the amplifier on the second pass therethrough and is reflected off the polarizer as an output beam from the laser system.

It has previously been demonstrated that stimulated Brillouin scattering of a laser beam results in a phase conjugated and distortion-free retroreturn of the incident laser beam even in the presence of a phase aberrator. Furthermore, the directionality of the output is not affected by any vibrations or small movements of the amplifier. Such a phase conjugate amplifier laser system is characterized by high-fidelity amplification and a stable output beam direction. The heat generated in the laser rods however limit their frequency of laser pulse amplification.

The present invention provides an increased pulse repetition frequency by the use of a plurality of the solid state laser rod type amplifiers and synchronously time-multiplexing the oscillator laser beam pulses sequentially into each of the plurality of amplifiers so that each individual amplifier operates at a rate of say no higher than 60 Hertz so that the individual amplifiers will not overheat. The outputs from each amplifier is automatically and stably aligned with the outputs of the other amplifiers. The result is an amplified laser output beam from the system which has a pulse repetition frequency of a single amplifier times the number of amplifiers.

A similar patent application is concurrently filed, titled "Gatling Gun Laser Amplifier Using An Optical Diode" by the present co-inventors and Richard Utano. The other application is however distinctly different from the present invention.

SUMMARY OF THE INVENTION

The invention is comprised of a laser oscillator which transmits oscillator laser input beam pulses toward a polarizer which routes the linearly polarized laser beam pulses onto the surface of a rotating mirror means, such as a rotable flat mirror which in turn reflects the beam pulses into the inputs of a plurality of laser amplifiers in a synchronous manner where the laser beam pulses are amplified, made circularly polarized, retroreflected and turned back to linear polarization but rotated 90° with respect to incident polarization, amplified a second time on the return through each of the amplifiers, is reflected off the rotatable flat mirror surface and travels back to the polarizer and is reflected off the polarizer and out of the laser system as an output laser beam pulse which has been twice amplified and polarization rotated by 90°.

In one embodiment only one mirror is used and is preferably rotatable about the end of a shaft connected to a constant speed motor. The mirror is rotatably synchronized to align each subsequent input beam pulse with the input to the subsequent amplifier. The amplifiers are preferably positioned in a circle about the mirror with the number of amplifiers used in this or any of the other embodiments limited only by the physical space required for the amplifiers or the capacity of the laser oscillator to produce the number of beam pulses. The prior art phase conjugate power amplifiers may be used in any of the embodiment. It is the combination of all the amplifiers in a Gatling gun order of either sequentially switching the amplifiers, or firing two or more of the amplifiers in bursts, to prevent overheating of any individual amplifier and provide a much higher pulse repetition frequency that is novel.

A second embodiment uses two rotatable flat face mirrors connected at opposite ends of a common shaft which is turned in synchronization with the input beam pulses by a constant speed motor. Both the mirrors are rotated about the inputs and outputs of the plurality of amplifiers with both mirrors simultaneously aligned with an individual amplifier. The optical path from the rotatable mirror to each of the amplifiers have a fixed flat face mirror in optical alignment to form folded optical paths between the rotatable mirror and each of the amplifiers. In this embodiment, the output fixed mirrors and rotatable mirrors are aligned with a quarter-wave plate and a phase conjugate mirror comprised of the focusing lens and a stimulated Brillouin scattering cell to rotate and retroreflect the output from each of the plurality of amplifiers back through these amplifiers. Only one set of quarter-wave plate, focusing lens, and cell are required. Each of the twice amplified output pulses are then routed out of the laser system by the polarizer.

The laser oscillator input laser beam pulses to the switched amplifiers and the amplified output beam pulses are always at 90° polarization rotated from each other. Their positions may be interchangeable however. For example, the oscillator input beam may have the polarization so as to pass directly through the polarizer and the output beam be reflected off the polarizer or the input beam may be reflected off the polarizer and output beam pass directly through the polarizer. In some instances the latter is very desireable since the laser oscillator may extend down to the eye sight level of the operator of a military vehicle and the polarizer be mounted above the operator in a more desireable line of sight for the laser output beam pulses to travel from vehicle to vehicle.

The invention will become better understood by review of the detailed description herein below with reference to the following drawings.

DETAILED DESCRIPTION OF THE PREFERRED EMBODIMENT

Figure 1:
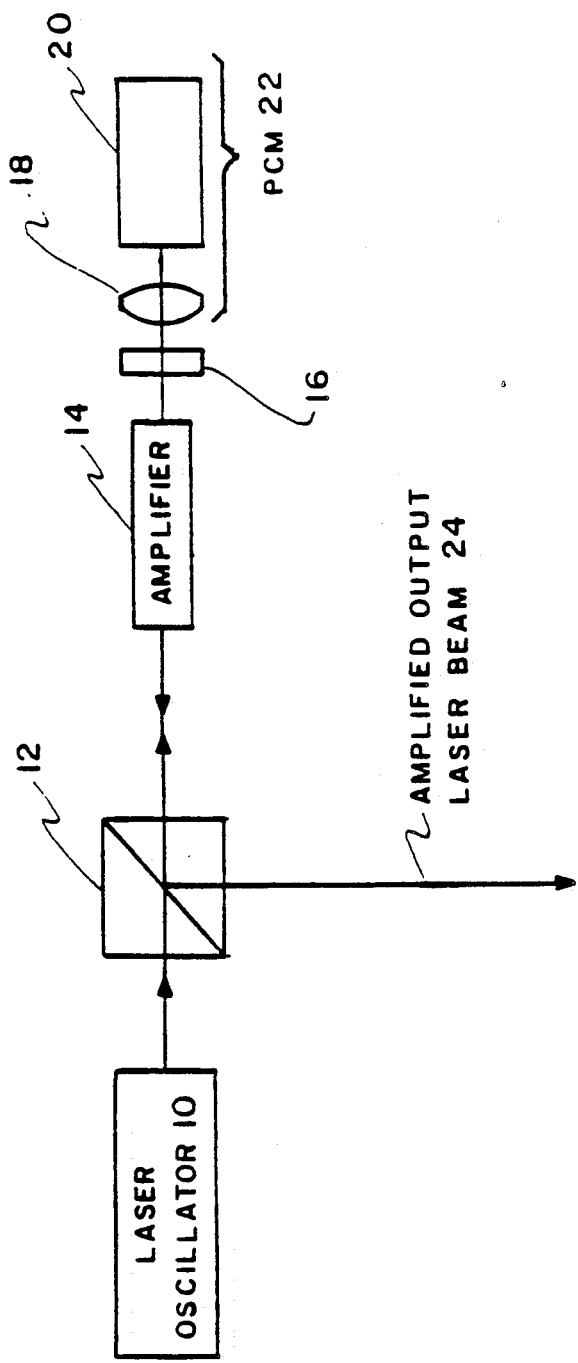
FIG. 1 illustrates schematically a prior art phase conjugate amplifier.

FIG. 1 illustrates a single phase conjugate amplifier which has previously been used to amplify the low energy laser beam from a laser oscillator. This prior art oscillator is hereby discussed to explain its function and how the present invention may use a plurality of the same type amplifiers 14, quarter-wave plates 16 and phase conjugate mirrors 22, which are comprised of a focusing lens 18 and stimulated Brillouin scattering cells 20, to provide the present Gatling gun type laser using rotating mirrors.

The polarizer 12 passes laser beam pulses from oscillator 10 therethrough as linearly polarized input laser beam pulses to a solid state laser amplifier 14. The pulses are amplified by 14 as they pass therethrough and are made circularly polarized by a quarter-wave plate 16 and enter a phase conjugate mirror 22, comprised of a focusing lens 18 that focuses the circularly polarized beam pulses into a stimulated Brillouin scattering cell 20. Cell 20 provides retroreflection for the input laser beam pulses back through 18 and is turned back to linear polarization but rotated at 90° with respect to incident polarization by 16 and is amplified a second time by 14. The twice amplified laser beam output pulses from 14 are reflected off the polarizer and out the laser system since they have been polarization rotated through 90°. Cell 20 preferably contains a gas, such as methane or nitrogen, at high pressure. The frequency of this laser system is not significantly changed by the twice amplification and rotation functions of 14, 16, 18 and 20. The present invention provides a means of using a plurality of laser amplifiers, quarter-wave plates, lenses, and retroreflectors in association with rotating mirrors to increase the laser system pulse repetition frequency an amount equal to the pulse repetition rate of one amplifier times the total number of amplifiers synchronously activated with the laser oscillator 10 beam pulses. It is noted that the laser oscillator and plurality of laser amplifiers should be made of the same material in each embodiment. The laser materials may be gaseous, liquid, or solid state. A good solid state laser oscillator and amplifiers may be made of neodymium: yttrium aluminum garnet.

Figure 2:
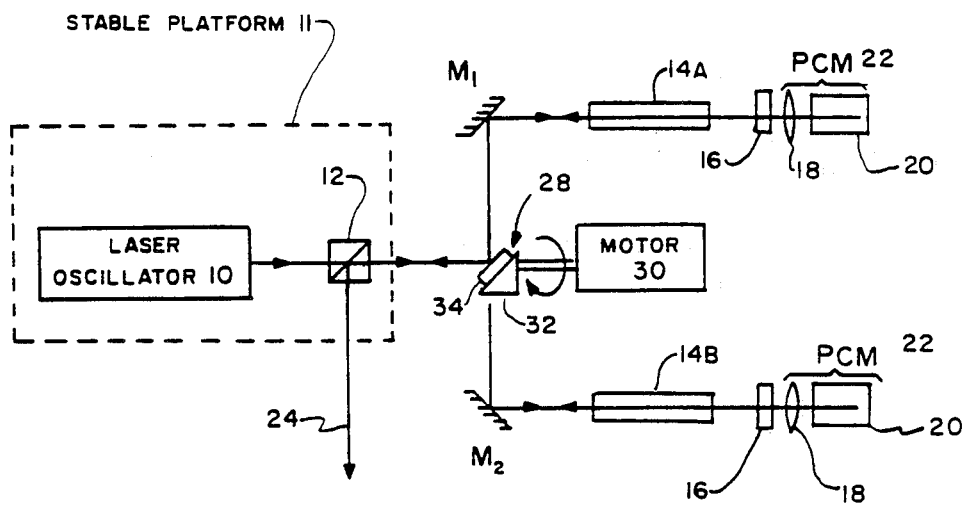
FIG. 2 illustrates a first embodiment of the present time-multiplexed laser system using rotating mirrors.

Refer now to FIG. 2 for a more detailed description of one embodiment of the invention. The oscillator 10 and polarizer 12 are shown within a dashed line area 11, which represents that these elements are generally mounted on a stabilized non-moving platform. Everything else shown in FIG. 2 may be on a moving vehicle. By the very nature of the amplifier incorporating the quarter-wave plate and a phase conjugate mirror, comprising the lens and a cell in which stimulated Brillouin scattering occurred, results in a phase conjugated and distortion free retroreturn of the input laser beam pulses even during some external phase aberration and small movements of any of these elements, the amplified output beam 24 from the laser system is stable and has an output beam direction that remains stable against vibrations and small scale misalignment of the amplifiers 14A or 14B and their associated elements 16, 18 and 20.

The rotatable mirror assembly 28 is preferably comprised of a prism shaped base 32 and a mirror 34 mounted thereon at 45° from the axis of rotation. The laser oscillator beam comes into optical alignment with a plurality of amplifiers, two which are shown as 14A and 14B but not limited to that number, and with the input beam pulses from oscillator 10. Prism base 32 is preferably made of aluminum and may be screw threadably attached at the end of the shaft which is coupled to the motor 30. The reflective mirror 34 preferably has a dielectric coating appropriate for reflecting the laser beam pulses therefrom.

Figure 3:
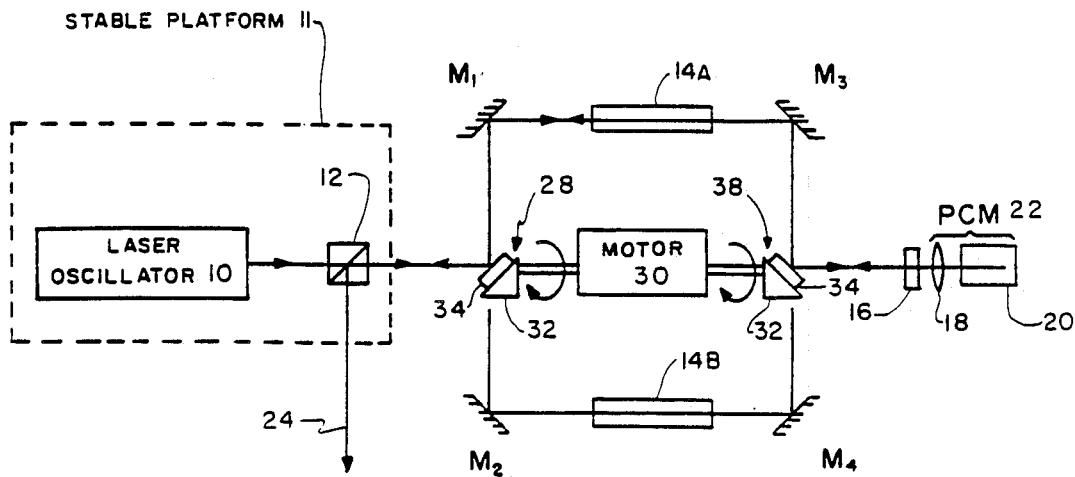
FIG. 3 is a schematic of a second embodiment of the present invention.

A second embodiment of the invention is shown in FIG. 3. In this case a second mirror 38 is attached to the other end of the same common shaft which is turned at a constant speed by motor 30. An important feature of this embodiment is that a common quarter-wave plate 16 and phase conjugate mirrors 22 may be used to polarization rotate and retroreflect for all of the plurality of amplifiers by using fixed mirrors M3 and M4 to fold the optical path respectively between amplifiers 14A and 14B and the 16 and 22 combinations.

Figure 4:
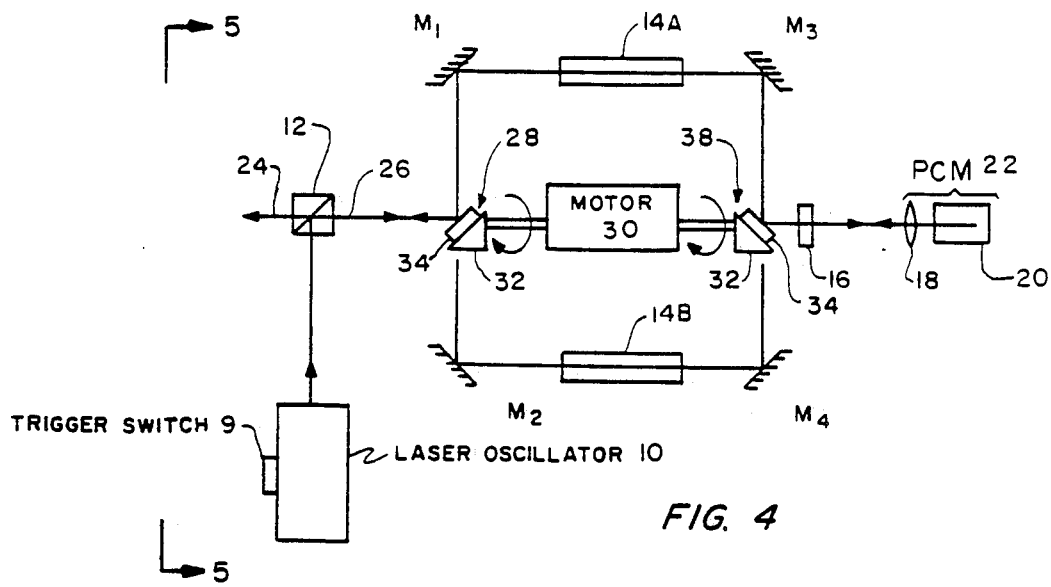
FIG. 4 illustrates an alternative of the second embodiment.

FIG. 4 is provided to show that an alternative to the embodiment of FIG. 3 can be used. In this embodiment, the polarizer 12 is oriented to reflect the input beam from oscillator 10 onto mirror assembly 28 and to pass the twice amplified and 90° polarization rotated output beam pulses 24 directly out the laser system along the optical axis 26 of the amplifiers. In this embodiment the oscillator 10 is conveniently offset instead of the output axis and is convenient for an operator to turn the oscillator 10 on by a trigger switch 9.

Figure 5:
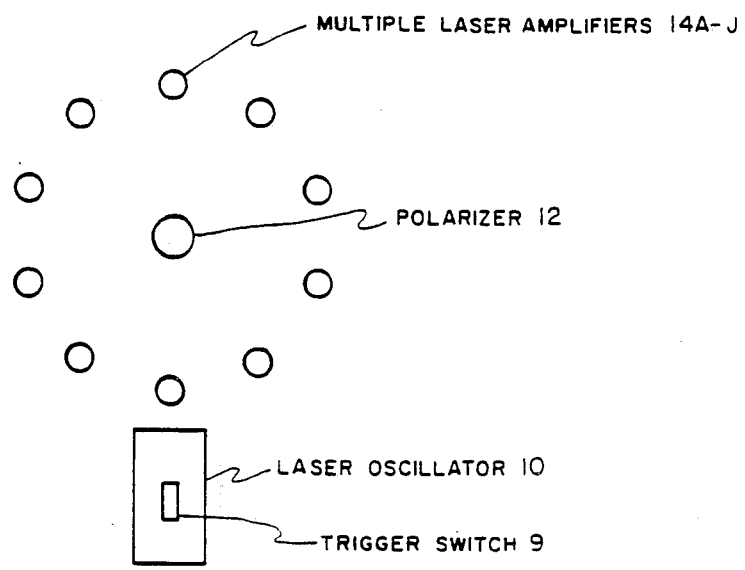
FIG. 5 is an end view of FIG. 4.

FIG. 5 illustrates schematically an output end view for the embodiment of FIG. 4, showing ten (10) amplifiers, represented by 14A-J. The number of amplifiers are not intended to be limited to 10 but are used herein to explain the invention. Since each of the amplifiers 14A-J are individually limited by excessive heating to a repetition frequency of about 60 Hertz, thus limiting the prior art to that rate, the present invention provides a means of having a laser oscillator which can operate at a much higher frequency, even up to and above one kilo Hertz.

Assume for explanation purposes that the laser oscillator system is desired to operate at 200 Hertz amplified output beam pulses and the number of amplifier units are ten, designated as 14A-J. Since the oscillator 10 can easily operate up to one kilo Hertz, the 200 Hertz is well within its capacity. The limiting elements are the individual amplifiers 14A-J which would overheat at 200 Hertz. This problem is solved by positioning ten of the amplifiers equally in a circle about the rotating mirror assembly 28 (FIG. 2 embodiment) or mirror assemblies 28 and 38 (FIGS. 3 and 4 embodiments). Each of the stationary amplifiers receive every tenth input beam pulse from oscillator 10 by the motor 30 speed of rotation being synchronized with the oscillator 10 firings so that each of the ten amplifier operates at 20 Hertz. That is, the rotating mirror assemblies 28 and 38 direct the input and retroreflected beam pulses sequentially to each of the ten amplifiers. The amplified output beam pulses from amplifiers 14A–J are automatically aligned in the same direction as the output beam pulses are reflected off of or passed through polarizer 12.

The rotating mirror assemblies 28 and 38 distribute the oscillator beam pulses to stationary amplifiers 14A–J. The retroreflecting phase conjugate mirrors 22 and the quarter-wave plates 16 ensure the stability and directionality of the output beam pulses if when there is vibration or slight misalignments of the amplifiers 14A–J. Use of the second rotating mirror assembly 38 on the common shaft of motor 30 with the first rotating mirror assembly 28 allows for the use of a common quarter-wave plate 16 and phase conjugate mirror 22 with each of the amplifiers 14A–J.

We claim:

1. A laser system for providing high pulse repetition frequency amplified output beam pulses, said system comprising:
    a laser oscillator which produces a reference wavefront of low energy laser beam pulses which are fired along an optical axis of said laser oscillator at a pulse frequency of said laser system;
    a polarizer positioned on said optical axis to pass said laser beam pulses through an input side thereof;
    a plurality of phase conjugate amplifiers fixed in a circle about the optical axis of said laser oscillator, each of said pluraltiy of phase conjugate amplifiers comprised of a laser amplifier associated with a quarter-wave plate and a phase conjugate mirror on an output side thereof, wherein said phase conjugate mirror is comprised of a focusing lens and a stimulated Brillouin scattering cell in which the stimulated Brillouin scattering of said laser input beam pulse results in a phase conjugated and distortion free retroreflection of said pulse;
    a rotating mirror means on said optical axis, said rotating mirror means synchronized with oscillator laser beam pulses to reflect subsequent pulses as laser input beam pulses to the input side of subsequent laser amplifiers of said plurality of phase conjugate amplifiers, wherein each of said input beam pulses is amplified as it passes through said laser amplifier, is made circularly polarized by said quarter-wave plate, and is retroreflected by said phase conjugate mirror back through said quarter-wave plate to become 90° polarization rotated with respect to input in which each of said output beam pulses is amplified twice as it passes through said laser amplifier and is reflected off said rotating mirror means and off an output side of said polarizer as one of a plurality of amplified output beam pulses in which the output beam pulses of each amplifier are aligned automatically resulting in a single laser beam of pulses having a pulse repetition frequency equal to the pulse repetition frequency of one laser amplifier times the total number of laser amplifiers.

2. A laser system as set forth in claim 1 wherein said rotating mirror means is a mechanically rotated flat faced dielectric coated mirror attached at the end of a shaft coupled to a constant speed motor to distribute said subsequent input beam pulses to subsequent inputs of stationary laser amplifiers.

3. A laser system as set forth in claim 2 wherein said flat faced dielectric coated mirror is attached to an aluminum prism base with the dielectric coated material appropriate for reflecting the laser radiation of said laser beam pulses.

4. A laser system as set forth in claim 1 wherein a common quarter-wave plate and phase conjugate mirror are associated with all the outputs of said plurality of laser amplifiers in which said rotating mirror means is comprised of a first flat faced mirror and a second flat faced mirror attached at opposite ends of a common shaft rotated by a constant speed motor wherein said first mirror distributes subsequent input beam pulses to subsequent inputs of stationary laser amplifiers and simultaneously said second flat mirror reflects the once amplified laser beam pulses through said common quarter-wave plate into said common phase conjugate mirror and reflects the retroreflected 90° polarization rotated output beam pulse back through each of said plurality of laser amplifiers.

* * * * *